United States Patent [19]

Harrison

[11] Patent Number: 5,592,440
[45] Date of Patent: Jan. 7, 1997

[54] COMPACT SLEEVE AIR GUN

[75] Inventor: E. R. Harrison, Plano, Tex.

[73] Assignee: I/O Exploration Products (U.S.A.), Inc., Houston, Tex.

[21] Appl. No.: 414,583

[22] Filed: Mar. 31, 1995

[51] Int. Cl.[6] .............................. G01V 1/02; H04R 23/00
[52] U.S. Cl. .................... 367/144; 181/115; 181/120
[58] Field of Search .................... 367/144; 181/115, 181/120

[56] References Cited

U.S. PATENT DOCUMENTS

| | | | |
|---|---|---|---|
| 4,472,794 | 9/1984 | Chelminski | 367/144 |
| 4,623,033 | 11/1986 | Harrison | 181/120 |
| 5,001,679 | 3/1991 | Harrison | 367/144 |
| 5,365,493 | 11/1994 | Harrison | 367/144 |

Primary Examiner—J. Woodrow Eldred
Attorney, Agent, or Firm—Haynes and Boone, L.L.P.; Tim Headley; John Moetteli

[57] ABSTRACT

A sleeve air gun for releasing compressed air into water. The air gun housing has a chamber enclosed with an end cap. The end cap is engaged with the air gun housing with a retainer that is light weight and expedites the engagement and disengagement of the end cap and housing. The retainer can comprise a light weight ring that engages the housing and end cap. The retainer uniquely permits larger diameter air guns to be constructed without disproportionately increasing the weight of the air gun. The larger diameter air gun expedites the discharge of compressed air from the air gun, which maximizes the acoustic pulse generated in the water.

16 Claims, 2 Drawing Sheets

COMPACT SLEEVE AIR GUN

BACKGROUND OF THE INVENTION

The present invention relates to air guns in marine seismic operations. More particularly, the present invention relates to a compact sleeve air gun that increases the chamber volume without substantially increasing the weight of the air gun.

Marine seismic operations record acoustic waves reflected from the sea floor and underlying geologic formations. The acoustic waves are generated by air guns that release air compressed between 2000 and 6000 psi. The acoustic pulse generated by a single air gun is magnified by additional air guns in a seismic array to produce large acoustic waves. These acoustic waves are reflected from the sea floor and geologic formations and are sensed by recording instruments having transducers for converting the acoustic waves into electrical signals. Thesee signals are recorded and subsequently processed to model the subsurface geologic formations.

Conventional air guns store compressed air in a housing that is released through valved ports in the housing. The released air forms a bubble in the water to create an acoustic pressure pulse. An electrically operated solenoid controls the operation of the valves and release of compressed air. One example of an air gun is shown in U.S. Pat. No. 4,623,033 to Harrison, Jr. (1986), wherein an air gun includes valved ports extending 360 degrees around the air gun housing. The port valve comprises a shuttle that reciprocates axially along the air gun.

U.S. Pat. No. 5,365,493 to Harrison (1994) describes an improved air gun that accelerates the shuttle as the air gun is fired. Another air gun design is shown in U.S. Pat. No. 5,001,679 to Harrison, Jr. (1991), wherein the compressed air is released from the housing by the operation of dual shuttles. The dual shuttle concept increases the efficiency of the air gun and the corresponding acoustic output by expediting the release of compressed air from the housing when the gun is fired.

Conventional air guns incorporate a threaded connection between the gun body and a cap which closes the end of the gun chamber. Because the dimensions of the threaded connection add significant weight, conventional air guns are relatively slender to reduce the size of the weight of the threaded connection, and are relatively long to increase the volume of the firing chamber. Since the relatively longer air guns do not release the compressed air as efficiently as a shorter air gun, conventional designs do not efficiently maximize the ratio of weight to length.

The weight of an air gun is important because flotation devices support the air guns in a seismic array, and paravanes spread the flotation devices and air guns as the tow vessel moves through the water. If the weight of the air guns increases, the flotation devices must similarly increase to support the air gun weight. Because larger flotation devices experience greater drag than smaller flotation devices, larger flotation devices require greater towing energy and further require larger paravanes to maintain the spread of the air gun arrays in the water.

Accordingly, a need exists for an improved sleeve air gun that increases the acoustic pressure generated by an air gun without significantly increasing the weight of the air gun.

SUMMARY OF THE INVENTION

The present invention provides an improved air gun for releasing compressed air into the environment. A housing defines a chamber for storing the compressed air, and further defines a port for releasing the compressed air. A valve is movable relative to the housing for selectively opening the port. An actuator selectively moves the valve to open the port and to permit the release of the compressed air, an end cap closes the housing chamber, and a retainer detachably engages the end cap to the housing.

In other embodiments of the invention, two opposing air guns can be connected in series so that the respective shuttles move opposite directions to balance the operation of the dual air gun. The housing can be substantially cylindrical, and the housing width can substantially equal the housing length to maximize the acoustic pressure generated by the release of compressed air in the water.

DESCRIPTION OF THE PREFERRED EMBODIMENTS

Figure 1:
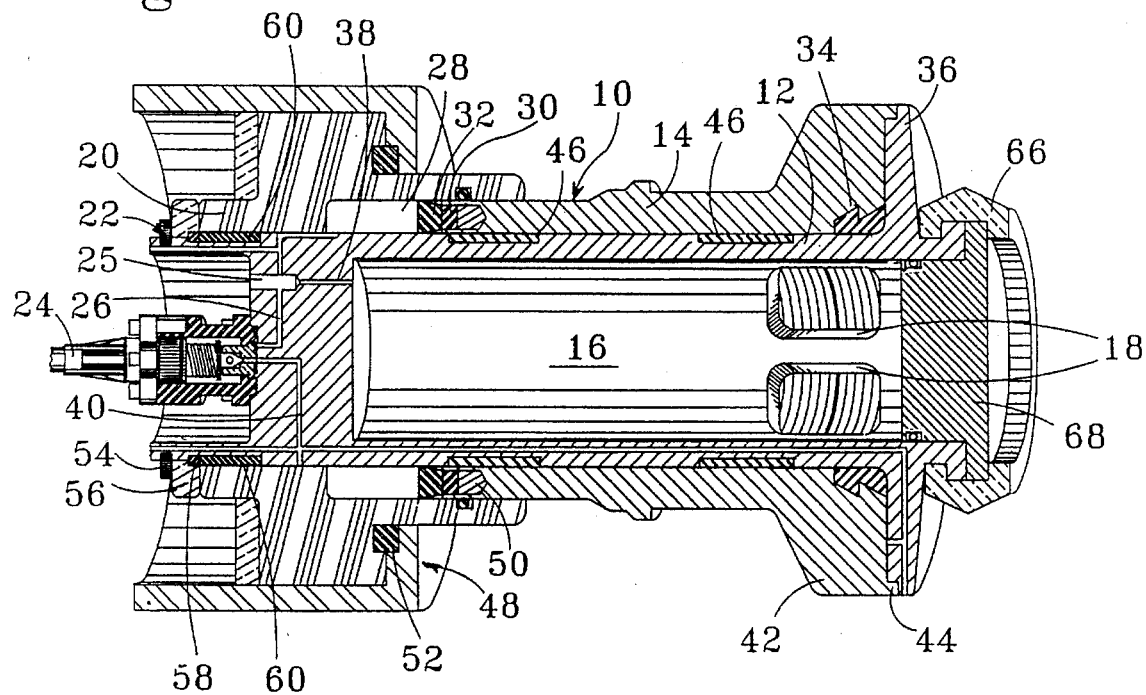
FIG. 1 illustrates a sectional view of an air gun incorporating the present invention.

The present invention furnishes an improved sleeve air gun that increases the air gun chamber volume without substantially increasing the air gun weight. FIG. 1 illustrates air gun 10 generally comprising housing 12 and shuttle 14. Housing 12 includes main chamber 16 that defines an interior volume for storing compressed air. Ports 18 are positioned in the walls of main chamber 16 to selectively control the release of compressed air into the environment.

End cap 20 is engaged with housing 12 by retainer 22, and an actuator such as solenoid valve 24 is engaged with cap 20. A source of high pressure gas (not shown) between 2000 and 6000 psi is connnected to fill port 25, and the compressed gas flows through spring chamber port 26 and into spring chamber 28. The air pressure from the compressed air source acts on first shuttle end 30, contained by seal 32, and provides a resulting force that moves shuttle 14 toward the closed position until face seal 34 contacts flange 36 of housing 12. Face seal 34 is held against flange 36 to seal ports 18 and to retain the compressed air in main chamber 16.

As the compressed air enters spring chamber 28, the compressed air simultaneously enters main chamber 16 through fill orifice 38. Because the main chamber 16 is substantially larger than spring chamber 28, the pressure of compressed air in spring chamber 28 acts against shuttle end 30, and shuttle 14 closes chamber 16 before the air pressure in main chamber 16 accumulates to prevent the movement of shuttle 14 to the closed position. The air pressure within spring chamber 28 and main chamber 16 reach the full charged pressure within seconds, and shuttle 14 is then retained in the closed position until air gun 10 is fired.

Air gun 10 is fired by applying an electrical current to actuator 24. An internal poppet (not shown) is moved from its sealing position and permits the compressed air to flow into firing passage 40. The compressed air charge flows through passage 40 and is directed to contact the face of shuttle second end 42. The compressed air charge is blocked from exiting air gun 10 by overhanging lip 44 of second end 42, and the conpressed air charge acts against second end 42 until the compressed air in main chamber 16 is released. The compressed air charge acting on second end 42 is significantly greater than the air pressure force acting on first end 30 in spring chamber 28 because the surface area of second end 42 is greater than the surface area of first end 30. The force imbalance resulting from this surface area differential initiates movement of shuttle 14 away from flange 36. During this movement, face seal 34 is withdrawn from contact with flange 36 to open ports 18, and compressed air in main chamber 16 flows across the face of flange 36 and into the environment.

The large force imbalance generated by the compressed air charge against the differential surface areas of first end 30 and second end 42 accelerates shuttle 14 away from flange 36. This resulting force continues to increase as additional air flows from main chamber 16 and across flange 36. This opening force reaches its maximum level immediately before shuttle 14 clears lip 44, at which time the compressed air in main chamber 16 exhausts through ports 18 around the 360 degrees opening in shuttle 14 and into the environment. As shuttle 14 continues to accelerate, additional portions of ports 18 are uncovered by moving shuttle 14 to increase the exhaust port flow area and to increase the air discharge rate from main chamber 16.

The rapid discharge flow of air into the surrounding water forms a spherical bubble which accelerates outwardly from air gun 10. Because of the high acceleration rate of the spherical bubble, an acoustic pressure wave is created by the interface of the bubble space and the water. This pressure wave continues to increase while the bubble/water interface is accelerating, and the acoustic pressure peak is reached when the bubble/water interface velocity has reached the maximum level.

Because the volume of chamber 16 is fixed, the air discharge rate decreases as the bubble volume increases. This relationship limits the maximum acoustic pressure that can be achieved. To offset the impact of this decreasing air supply, the present invention maximizes the air flow area opening rate by providing air gun 10 with a relatively large diameter chamber 16 and corresponding shuttle 14. Because the available surface area of ports 18 increases exponentially as the diameter of chamber 16 increases, the large diameter of chamber 16 and shuttle 14 disclosed by the present invention substantially increases the surface area of ports 18 in comparison to conventional air guns. This result is achieved because the present invention substantially reduces the weight of conventional components connecting cap 20 to housing 12.

Figure 2:
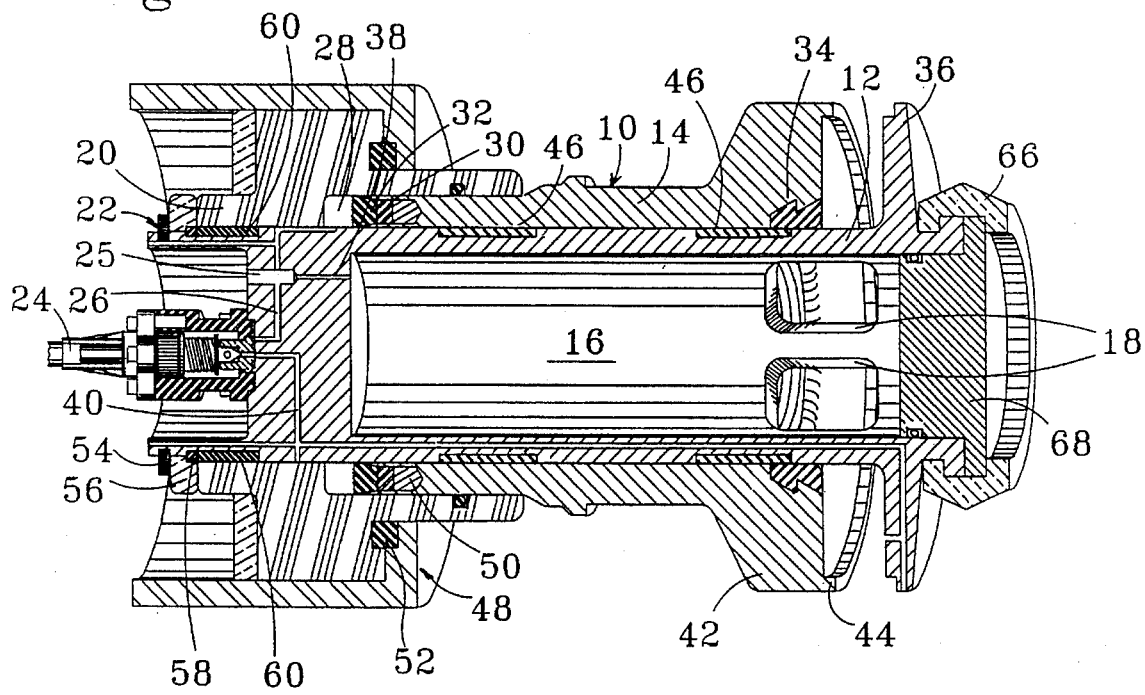
FIG. 2 illustrates a sectional view of an air gun where the shuttle is in the open position.

As shuttle 14 moves to the open position shown in FIG. 2, shuttle 14 is guided with low friction wear rings 46. Such wear rings 46 are replaceable and prevent shuttle 14 from contacting housing 12 surfaces.

Shuttle 14 decelerates as the supply of high pressure air continues to fill spring chamber 28, and as the compressed air charge pressure acting on shuttle second end 42 decreases. After the air pressure in main chamber 16 is reduced to a level where the opening force (main chamber 16 air pressure multiplied by the surface area of shuttle second end 42) equals the closing force (spring chamber 28 air pressure multiplied by the surface area of shuttle first end 30), shuttle 14 reaches an open position as shown in FIG. 2. Subsequently, as the air pressure in spring chamber 28 increases, shuttle 14 is returned to the closed position as shown in FIG. 1, and air gun 10 is recharged for the next shot.

Because multiple air guns 10 are used in seismic surveys, firing sensor 48 signals the firing of each air gun 10 so that the firing of guns 10 can be synchronized. Firing sensor 48 comprises magnets 50 on shuttle first end 30 and sensing coil 52 attached to cap 20. As shuttle 14 approaches sensing coils 52, magnets 50 generate an electrical signal which is transmitted to a gun monitor (not shown) for adjusting the subsequent firing pulses to synchronize the firing of air guns 10.

Referring to FIGS. 1 and 2, retainer 22 generally comprises split ring 54, retaining ring 56, and load ring 58. When split ring 54 is removed, retaining ring 56 can be removed to permit access to and removal of load ring 58. The removal of load ring 58 permits the removal of cap 20 from housing 12 by permitting cap 20 to be moved longitudinally along the center axis through main chamber 16. This removal permits easy access to the internal components of air gun 10 and facilitates the replacement of wear rings 46 and all internal seals. This feature significantly enhances the ability of maintenance personnel to repair or replace the internal components of air gun 10 in the field. This ease of field repair is desirable because it reduces down time for maintenance and repair operations. Keys 60 prevent cap 20 from rotating relative to housing 12.

If desired, chamber volume inserts (not shown) can be inserted in main chamber 16 to change the volume of air released from air gun 10. As known in the art, such chamber inserts can be constructed from a light weight material such as plastic or aluminum to adjust the volume of main chamber 16 without significantly adding weight to gun 10. Retainer 66 facilitates the removal of plug 68 so that chamber volume inserts can be quickly added or removed from main chamber 16.

Figure 3:
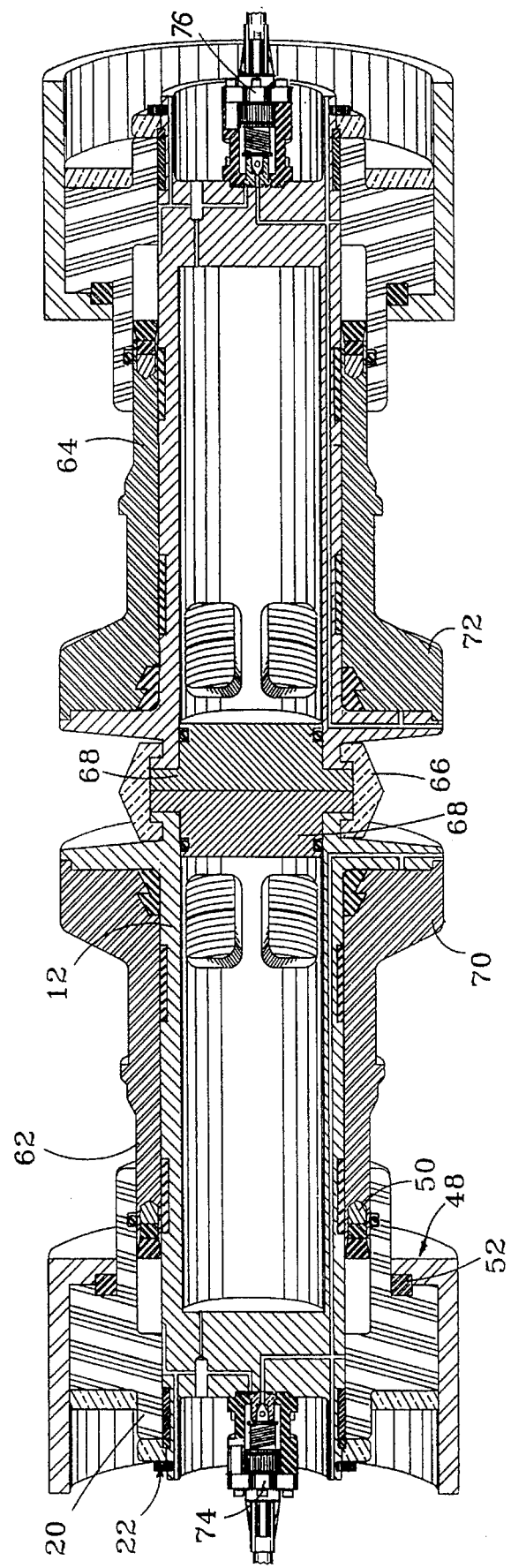
FIG. 3 illustrates two air guns connected in series to form a composite air gun.

In another embodiment of the invention, as shown in FIG. 3, first gun 62 can be connected opposite second gun 64 to create a cluster of two guns. Retainer 66 connects first gun 62 to second gun 64, and plugs 68 provide a positive internal stop for shuttles 70 and 72 and also seal the respective gun chambers. This configuration of the present invention prevents gun recoil by providing opposing, balanced shuttles 70 and 72. This embodiment of the invention is preferable to conventional dual shuttle air guns because the invention incorporates two actuators 74 and 76 which simultaneously fire in response to the firing signal, instead of the single actuator typically found in dual shuttle air guns. This dual firing feature substantially reduces the potential imbalance caused by a single actuator communicating to two shuttles through passages in the air gun body, and provides for more precise control of each shuttle. This benefit is particularly important to the operation of the spring chambers coincident with each shuttle. Moreover, this feature of the invention permits the use of identical air guns connected in series to provide a new air gun having properties which are different than the properties of the individual air guns. The flexibility of this feature in arranging air guns in a seismic array reduces the storage of unnecessary air guns and components on board a seismic vessel, and effectively increases operational efficiency.

The present invention provides substantial improvements over conventional air guns for the reasons stated above. Furthermore, the invention reduces the number of dynamic seals for the shuttle from three to one. The invention provides a lighter air gun relative to the air chamber volume, and the lighter weight reduces the wear of chains and shackles connecting the air guns to flotation devices in the water.

It will be appreciated that the element illustrated as retainer 22 can comprise numerous configurations and embodiments within the scope of the invention. Although retainer 22 is illustrated in one embodiment as comprising a combination of rings, retainer 22 can also comprise various mechanical elements such as removable pins, clips, fasteners, hooks, detent springs, and other mechanical elements suitable for holding cap 20 in engagement with housing 12. In other possible embodiments of the invention, retainer 22 can comprise a mechanical disconnect that permits the fast connection and disconnection of cap 20 from housing 12.

Although the invention has been described in terms of certain preferred embodiments, it will become apparent to those of ordinary skill in the art that modifications and improvements can be made to the inventive concepts herein without departing from the scope of the invention. The embodiments described herein are merely illustrative of the inventive concepts and should not be interpreted as limiting the scope of the invention.

What is claimed is:

1. An air gun for releasing compressed air into the environment, comprising:

a housing defining a chamber for storing the compressed air and further defining a port for permitting the release of the compressed air from the chamber into the environment;

a valve movable relative to the housing for selectively closing a portion of the port;

an actuator for selectively moving the valve to open the port and to permit the release of the compressed air into the environment;

an end cap for closing the housing chamber; and a retainer for detachably engaging the end cap to the housing, wherein the retainer is selected from the group consisting of a split ring, a removable pin, a clip, a hook, a detent spring, and a disconnect.

2. An air gun as recited in claim 1, wherein said housing is substantially cylindrical, and wherein said end cap closes one end of said cylindrical housing.

3. An air gun as recited in claim 1, wherein, said retainer comprises a first ring for engaging said end cap with said housing, and a second ring for preventing movement of said first ring.

4. An air gun as recited in claim 1, further comprising a key for preventing relative movement between said end cap and said housing.

5. An air gun as recited in claim 1, further comprising a second housing attached to said housing, a second valve within said second housing, a second actuator for selectively moving said second valve, and a second retainer for detachably engaging a second end cap to said second housing.

6. An air gun as recited in claim 1, wherein said end cap is detachable to permit the separation of said valve from said housing.

7. An air gun as recited in claim 1, wherein the disconnect is configured for expediting the engagement and disengagement of the cap relative to the housing.

8. An air gun as recited in claim 1, wherein said valve comprises a substantially cylindrical shuttle.

9. An air gun for releasing compressed air into the environment, comprising:

a substantially cylindrical housing defining a chamber for sorting the compressed air, wherein the housing defines a port for permitting the release of the compressed air from the chamber into the environment;

a substantially cylindrical valve movable relative to the housing for selectively closing a portion of the port;

an actuator for selectively moving the valve to open the port to permit the release of the compressed air, and to close the port to contain additional compressed air;

a substantially circular end cap for closing one end of the housing chamber; and a retainer for detachably securing the end cap to the housing, wherein the retainer is selected from the group consisting of a split ring, a removable pin, a clip, a hook, a detent spring, and a disconnect.

10. An air gun as recited in claim 9, further comprising a key for preventing relative movement between said end cap and said housing.

11. An air gun as recited in claim 9, wherein said retainer holds said end cap in sealing engagement with said housing.

12. An air gun as recited in claim 9, further comprising a channel for transmitting compressed air from said actuator for accelerating the opening of said valve.

13. An air gun for maximizing the acoustic pressure generated by the release of compressed air into a body of water, comprising:

a housing defining a chamber for storing the compressed air and further defining a port for permitting the release of the compressed air from the chamber into the environment, wherein the width of the housing is substantially equal to the length of the housing;

a valve movable relative to the housing for selectively closing a portion of the port;

an actuator for selectively moving the valve to open the port and to permit the release of the compressed air into the environment;

an end cap for closing the housing chamber; and a split ring, wherein the housing defines a groove formed around at least a portion of the circumference of the housing for receiving the split ring and securing the end cap to the housing.

14. An air gun as recited in claim 13, further comprising a first ring for engaging said end cap with said housing, and a second ring for preventing movement of said first ring relative to said housing.

15. An air gun as recited in claim 13, wherein said air gun is attachable to an opposing second air gun so that said valves move in opposite directions along a common center axis.

16. An air gun as recited in claim 13, wherein the split ring is configured for expediting the engagement and disengagement of the cap relative to the housing.

* * * * *

UNITED STATES PATENT AND TRADEMARK OFFICE
CERTIFICATE OF CORRECTION

PATENT NO.   : 5,592,440
DATED        : January 7, 1997
INVENTOR(S)  : E.R. Harrison It is certified that error appears in the above-indentified patent and that said Letters Patent is hereby corrected as shown below:

Col. 1, line 19, "Thesee" should read --These--.

Col. 2, line 67, "conpressed" should read --compressed--.

Col. 6, line 4, "sorting" should read --storing--.

Signed and Sealed this

Eighth Day of April, 1997

Attest:

BRUCE LEHMAN

Attesting Officer

Commissioner of Patents and Trademarks